United States Patent [19]

Nakagawa et al.

[11] 4,094,728

[45] June 13, 1978

[54] TIRE TUBE MAKING APPARATUS

[75] Inventors: Yohachiro Nakagawa, Kodaira; Akio Tanihata, Akigawa, both of Japan

[73] Assignee: Bridgestone Tire Company Limited, Tokyo, Japan

[21] Appl. No.: 741,030

[22] Filed: Nov. 11, 1976

[30] Foreign Application Priority Data

Nov. 14, 1975   Japan .................... 50-136871

[51] Int. Cl.$^2$ ............................. B29H 15/00
[52] U.S. Cl. .................... 156/514; 156/120; 156/552
[58] Field of Search ............. 156/394, 110 R, 118, 156/120, 503, 513, 514, 541, 552, 567

[56] References Cited

U.S. PATENT DOCUMENTS

| | | | |
|---|---|---|---|
| 2,065,033 | 12/1936 | Stevens | 156/120 |
| 2,186,286 | 1/1940 | Engler et al. | 156/120 |
| 2,272,895 | 2/1942 | Stevens | 156/120 |
| 2,311,600 | 2/1943 | Shook | 156/514 |
| 3,069,303 | 12/1962 | Scholle | 156/120 |
| 3,117,050 | 1/1964 | Otstot | 156/503 |
| 3,244,576 | 4/1966 | Swartz | 156/552 |
| 3,434,908 | 3/1969 | MacDonald | 156/514 |
| 3,490,979 | 1/1970 | Calvert et al. | 156/552 |
| 3,748,210 | 7/1973 | Beutl | 156/567 |

Primary Examiner—William A. Powell
Assistant Examiner—John E. Kittle
Attorney, Agent, or Firm—Cushman, Darby & Cushman

[57] ABSTRACT

A tire tube making apparatus is to continuously apply tube valves onto a tube material around air introducing bores perforated in an upper half portion of the tube material. The apparatus comprises: a conveyor mechanism for conveying a tube material; a perforating mechanism for perforating air introducing bores longitudinally equally spaced in an upper half portion of the tube material; a valve feeding mechanism for intermittently feeding a tube valve one by one to a predetermined position above the line passing through the air introducing bores perforated in the tube material which is continuously conveyed by the conveyor mechanism; a valve transferring mechanism for suckingly holding the tube valve fed by the valve feeding mechanism to transfer the tube valve one by one on the air introducing bore in synchronism with the transfer of the air introducing bore of the tube material; and a valve urging mechanism for detecting the tube valve transferred by the valve transferring mechanism to urge the tube valve against the tube material for a predetermined period of time in synchronism with the transfer of the tube valve.

2 Claims, 16 Drawing Figures

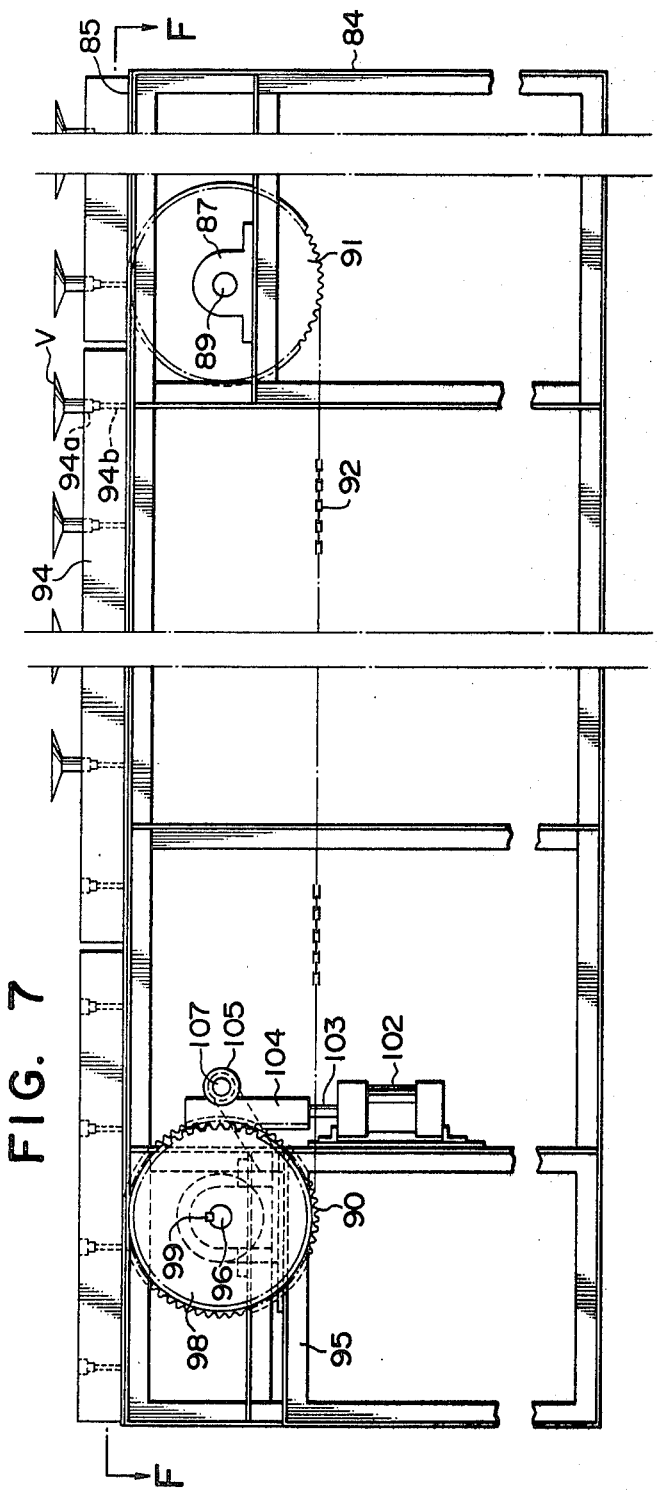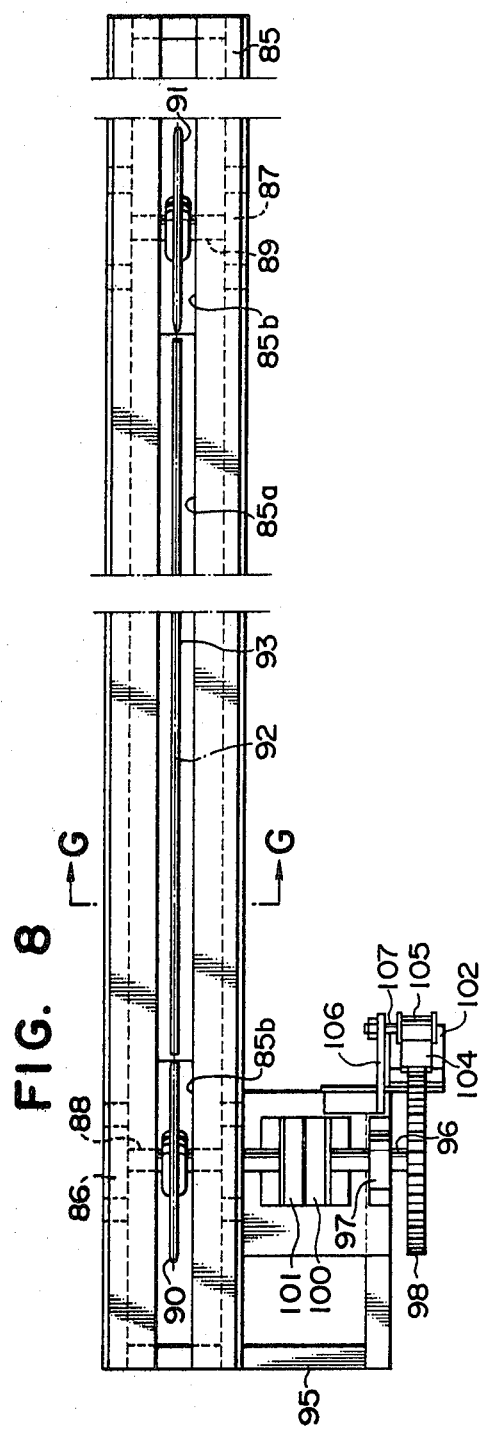
FIG. 7
FIG. 8

TIRE TUBE MAKING APPARATUS

This invention relates to a tire tube making apparatus, and in particular to an apparatus for applying tube valves onto a tube material around perforated air introducing bores while the tube material is being extruded by a suitable extruder.

As a generally known tire tube making apparatus there has been proposed such an apparatus that a tube material is perforated forming air introducing bores at an equally spaced distance after being extruded by a suitable extruder and thereafter cut to a predetermined length while being conveyed by a conveyor mechanism. In this conventional apparatus, the tube valve is manually applied onto the tube material around the air introducing bore while being centered thereto by an attendant operator at the other place. Another apparatus also has been proposed to provide a conveyor for conveying the tube material having a festoon portion over which the tube material passes to be temporally stopped for being perforated with the air introducing bore around which the tube valve is applied on the tube material. The former apparatus, however, requires a separate operating place for applying the tube valves onto the tube material since the application operation is carried out in the other process. Moreover, the application operation is time consuming and of extremely low efficiency since it is manually done. On the other hand, the latter apparatus does not cause such drawbacks as in the former apparatus since the application operation is reliably and mechanically performed, however, the temporal stopping to the tube material for application of the tube valve makes it impossible for the conveyor to be enhanced in linear speed, limiting a production rate for the manufacture of tire tubes. The increase of the production rate entails many equipments which in turn requires more spacious floor as well as much cost therefor.

It is therefore an object of the present invention to provide a tire making apparatus for continuously applying the tube valves onto the tube material.

It is another object of the present invention to provide a tire making apparatus for enhancing a production rate for the manufacture of tire tubes.

The above objects will be attained by a tire making apparatus of the present invention which comprises: a conveyor mechanism for conveying a tube material; a perforating mechanism for perforating air introducing bores longitudinally equally spaced in an upper half portion of the tube material; a valve feeding mechanism for intermittently feeding a tube valve one by one to a predetermined position above the line passing through the air introducing bores perforated in the tube material which is continuously conveyed by the conveyor mechanism; a valve transferring mechanism for suckingly holding the tube valve fed by the valve feeding mechanism to transfer the tube valve one by one on the air introducing bore in synchronism with the transfer of the air introducing bore of the tube material; and a valve urging mechanism for detecting the tube valve transferred by the valve transferring mechanism to urge the tube valve against the tube material for a predetermined period of time in synchronism with the transfer of the tube valve.

The above and other objects, features and advantages of the present invention will become clear from the following particular description of the invention and the appended claims, taken in conjunction with the accompanying drawings which show by way of example a preferred embodiment of the present invention.

In the accompanying drawings:

FIG. 7 is a view as seen from the line E—E of FIG. 2;

FIG. 8 is a view as seen from the line F—F of FIG. 7;

FIG. 1 is a plan view of a valve displacing arrangement of the tire tube making apparatus;

Figure 1:
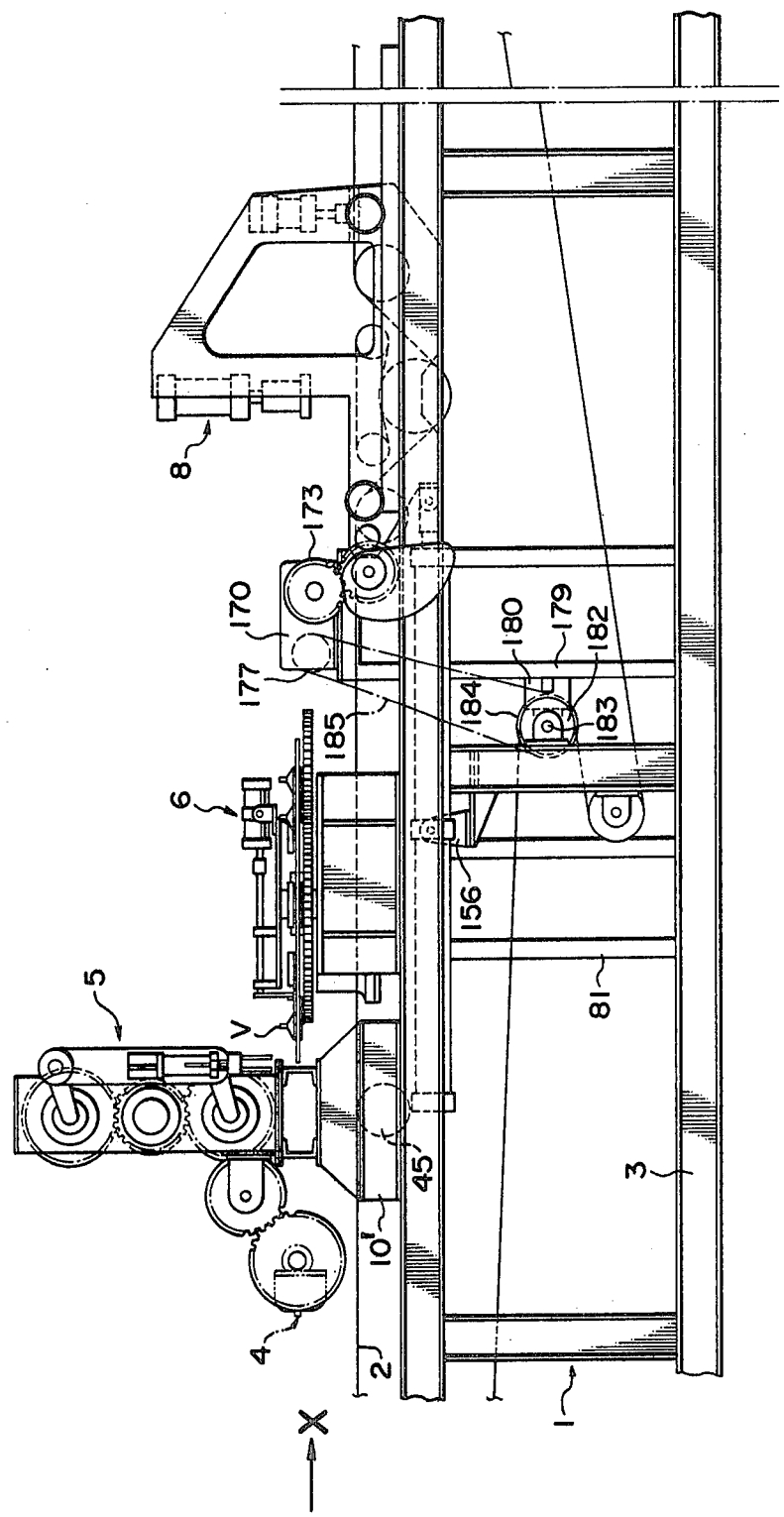
FIG. 1 is a schematic front elevational view of a tire tube making apparatus embodied in accordance with the present invention.
Figure 2:
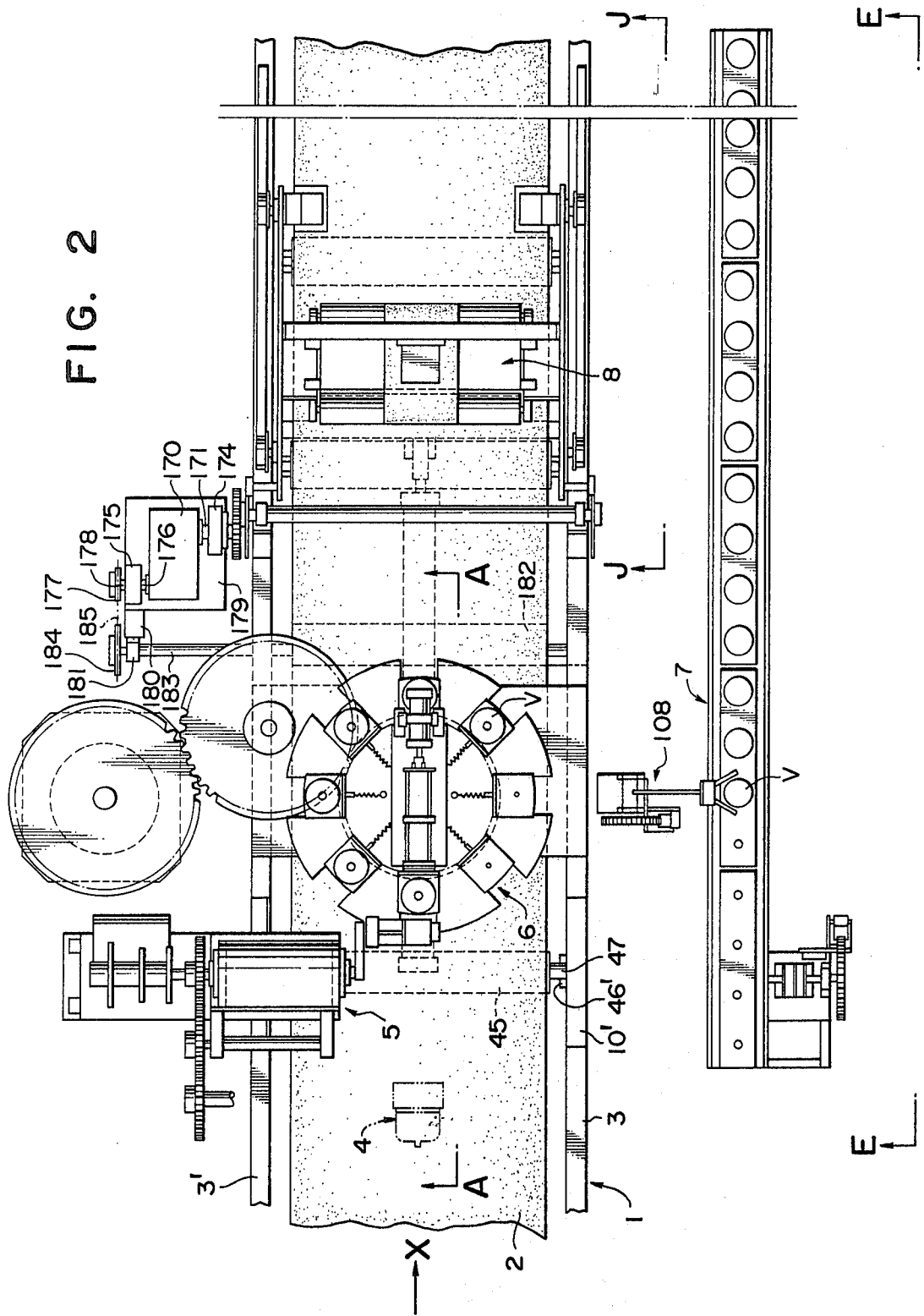
FIG. 2 is a schematic plan view of the tire tube making apparatus shown in FIG. 1.

Referring now to the drawings and in particular to FIGS. 1 and 2, the reference numeral 1 generally designates a conveyor mechanism for conveying a tube material T continuously extruded by an extruder which is not shown in any drawings. The conveyor mechanism 1 comprises an endless belt 2, having thereon a tube material T, which is adapted to be driven by a driving mechanism (not shown) to convey the tube material T in a direction shown by the arrow X. The conveyor mechanism 1 further comprises a pair of frames 3 and 3' each of which is constituted of channel steel. The reference numeral 4 generally designates a perforating mechanism for perforating air introducing bores longitudinally equally spaced in an upper half portion of the tube material T, the perforating mechanism 4 being well known in the art and thus not described hereinafter in detail. The reference numeral 5 generally designates a valve transferring mechanism which is positioned forwardly of the perforating mechanism 4 to transfer the tube valve V one by one on the air introducing bores of the tube material T after the tube material T is perforated by the perforating mechanism 4. The reference numeral 6 generally designates a valve feeding mechanism which is positioned forwardly of the valve transferring mechanism 5 to intermittently feed the tube valves V one by one to a predetermined position of the valve transferring mechanism 5, the predetermined position being above the line passing through the air introducing bores perforated in the tube material T. The reference numeral 7 generally designates a valve replenishing mechanism for replenishing the tube valve V onto a predetermined position of the valve feeding mechanism 6. The reference numeral 8 generally designates a valve urging mechanism which is arranged to sufficiently urge the tube valve V against the tube material T for a predetermined period of time in synchronism with the transfer of the tube valve V, i.e., without stopping the endless belt 2, after the tube valve V is transferred or applied onto the tube material T by the valve transferring mechanism 5.

The particular constitutions of the above mechanisms will be described with reference to FIGS. 3 to 16.

Figure 3:
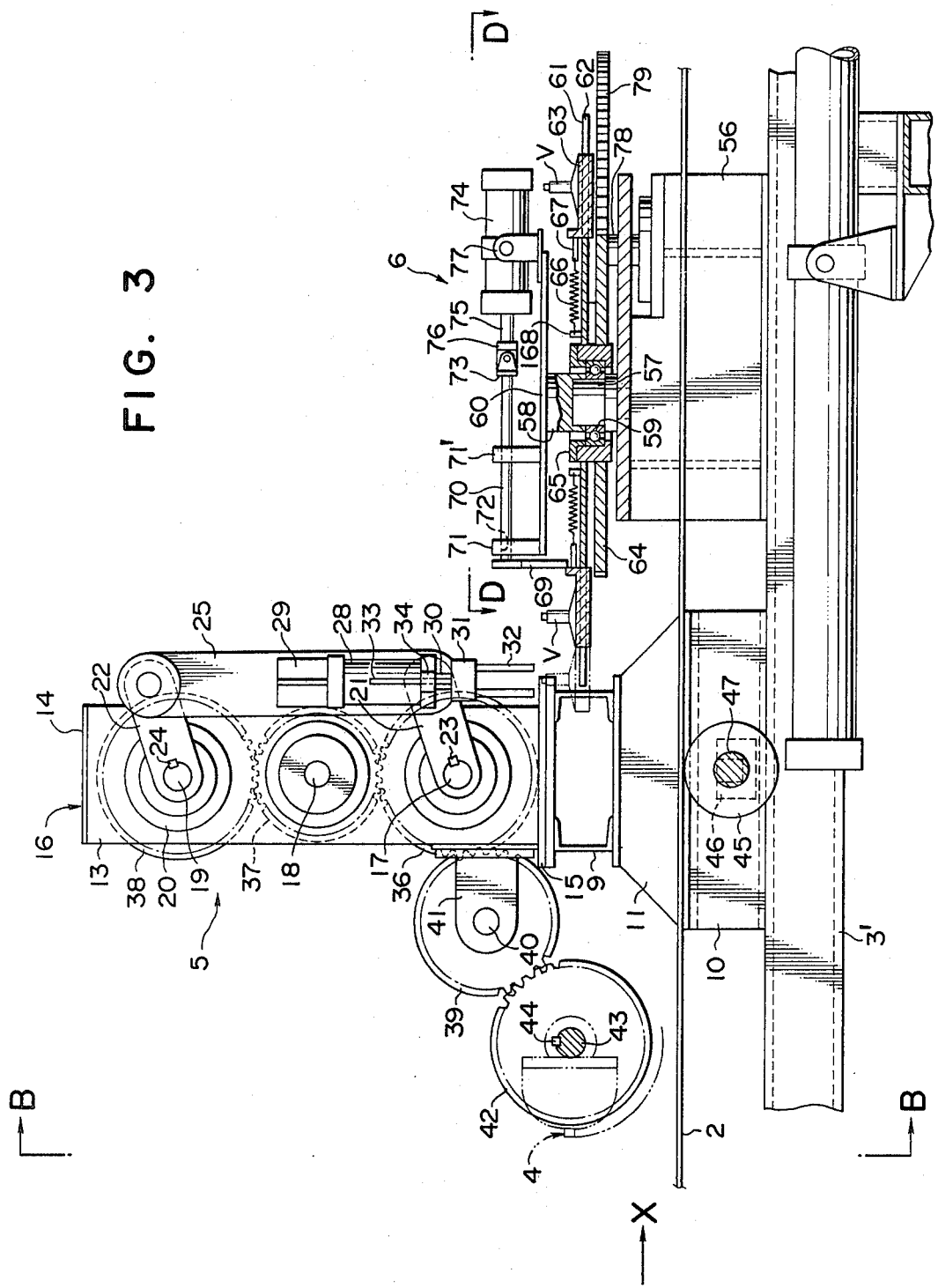
FIG. 3 is an enlarged view as seen from the line A—A of FIG. 2.
Figure 4:
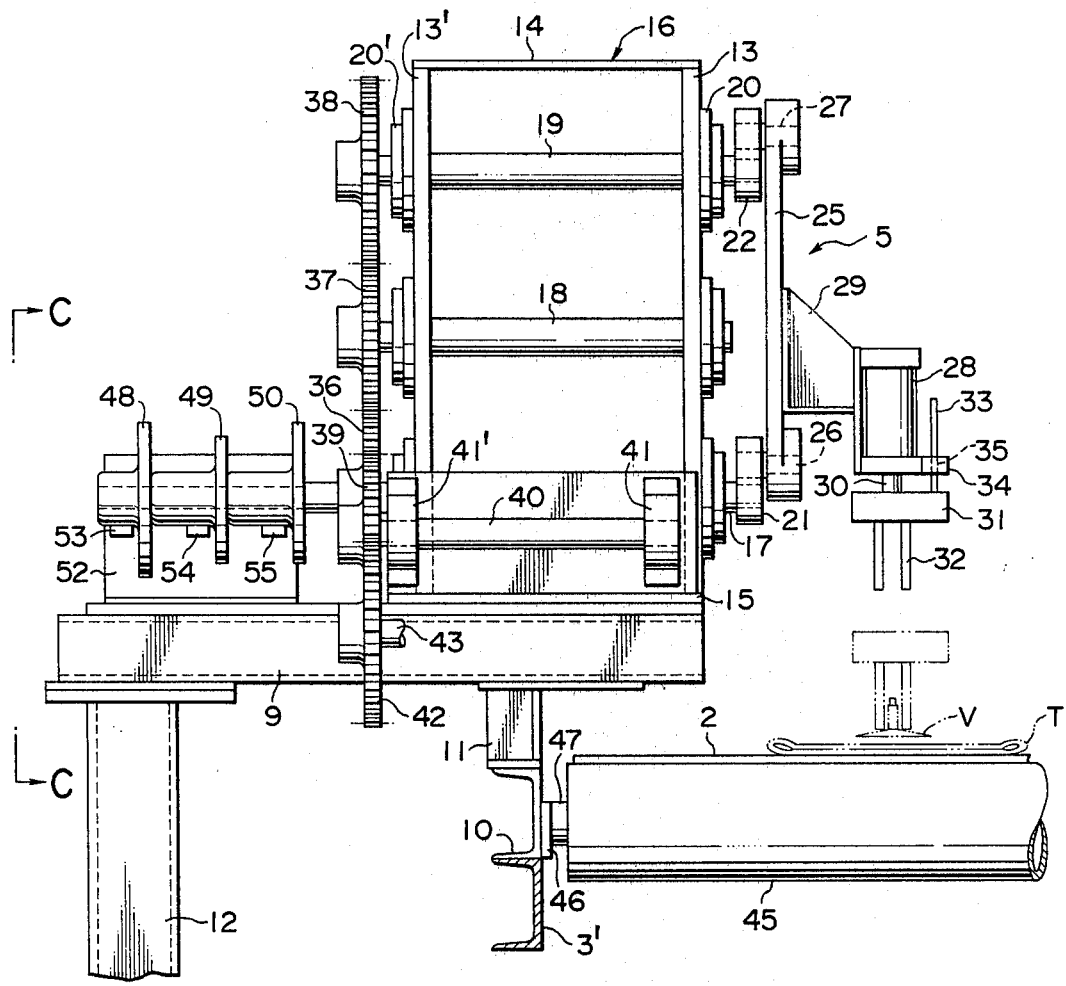
FIG. 4 is a view as seen from the line B—B of FIG. 3.
Figure 5:
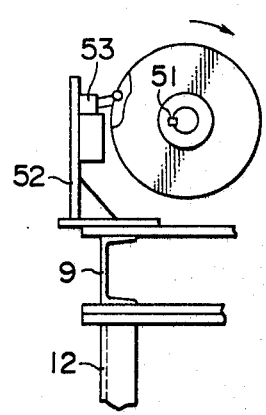
FIG. 5 is a view as seen from the line C—C of FIG. 4.

The valve transferring mechanism 5 is shown in FIGS. 3 to 5 as comprising a horizontally extending base 9 supported on the frame 3' of the conveyor mechanism 1, brackets 10, 11 and an upstanding post 12. A bracket generally designated at 16 is mounted on the half portion of the base 9 in proximity of the conveyor mechanism 1 and comprises a pair of spaced parallel upstanding plates 13 and 13', an upper plate 14 having both ends securely connected to the upper ends of the upstanding plates 13 and 13', and a lower plate 15 having both ends securely connected to the lower ends of the upstanding plates 13 and 13'. Three vertically spaced parallel shafts 17, 18 and 19 are each adapted to be rotatably received at its both ends of the upstanding plates 13 and 13' through bearings 20 and 20', extending horizontally and perpendicularly to the endless belt 2 of the conveyor mechanism 1. The shafts 17 and 19 have axial portions extending outwardly of the upstanding plate 13 toward the conveyor mechanism 1 and securely connected to one ends of arm members 21 and 22, respectively, through keys 23 and 24, respectively. A vertical link member 25 is pivotally connected at its both ends with the other ends of the arm members 21 and 22 through pivotal pins 26 and 27, respectively, so that a parallelogram is formed by the line passing through the axes of the shafts 17, 18, 19, the arm member 21, 22 and the link member 25. A fluid-operated cylinder 28 is supported on the outer side of the link member 25 through a bracket 29 to have a piston rod 30 downwardly extending. A valve holding member 31 is attached to the leading end of the piston rod 30 of the fluid-operated cylinder 28, having four downwardly extending pipes 32 for sucking holding the tube valve V. The valve holding member 31 is formed therein with a chamber which is connected to the pipes 32 and further alternatively to suitable compressed air source and vacuum source. A guide rod 33 is securely mounted on the valve holding member 31 to extend vertically and is slidably engaged with a bore 35 formed in a projection 34 provided on the lower end of the fluid-operated cylinder 28. Gears 36, 37 and 38 are securely carried on axial portions remote from the conveyor mechanism 1 through keys (not shown) in such a condition that the gear 37 is in meshing engagement with the gears 36 and 38.

A gear 39 which is meshed with the gear 36 is securely carried on one end of a shaft 40 which is rotatably supported on the bracket 16 through bearings 41 and 41'. A gear 42 is in meshing relation with the gear 39 and is securely carried on one end of a drive shaft 43 of the perforating mechanism 4 through a key 44 so that a rotational torque of the perforating mechanism 4 is transmitted to the gear 36 through the gears 42 and 39. The tooth numbers of the gears 36, 37, 38, 39 and 42 are adjusted to make it possible for the air introducing bore formed in the upper half of the tube material T to be conveyed immediately below the shaft 17 in opposing relation and registry with the valve holding member 31 after the perforating mechanism 4 is rotated downwardly to perforate the air introducing bore from a stationary position as shown in FIG. 3. The link member 25 assumes a position shown in FIG. 3 upon the perforating mechanism 4 being in the stationary position and is rotated anti-clockwise simultaneously with the rotation of the perforating mechanism 4. The lengths of the arm members 21 and 22 are also adjusted to have a circumferential speed of the free ends thereof in synchronism with the transfer speed of the endless belt 2 under a driving condition restrained by the gears 36, 37, 38, 39 and 42.

A roller 45 is provided below the valve holding member 31 to support the endless belt 2 and is rotatably supported through bearings (not shown) on a fixed shaft 47 which is in turn supported at its both ends on a U-shaped supporting members 46 and 46' fixed to the brackets 10 and 10' (see FIGS. 1 and 2).

Cam members 48, 49 and 50 are securely carried through a key 51 on the axial portion of the shaft 17 remote from the gear 36 and is designed to engageable with corresponding limit switches 53, 54 and 55 which are mounted on a bracket 52 attached onto the base 9. The limit switch 53 is adapted to be engaged with the cam member 48 to produce an electric signal to the valve feeding mechanism 6 when the arm members 21 and 22 start to be rotated. The limit switch 54 is adapted to be engaged with the cam member 49 to operate the fluid-operated cylinder 28 to have the piston rod 30 projected downwardly when the arm members 21 and 22 are stopped at the stationary position in FIG. 3. The limit switch 55 is adapted to be engaged with the cam member 50 to produce electric signals when the valve holding member 31 is rotated into the lowermost position and the stationary position just mentioned. One of the electric signals of the limit switch 55 produced when the valve holding member 31 is rotated into the lowermost position serves to change a changing valve (not shown) in communication to the compressed air source from the vacuum source in order to eject the tube valve V from the pipes 32, while the other electric signal of the limit switch 55 produced when the valve holding member 31 is rotated into the stationary position serves to change the changing valve in communication to the vacuum source from the compressed air source in preparation for suckingly holding the tube valve V.

Figure 6:
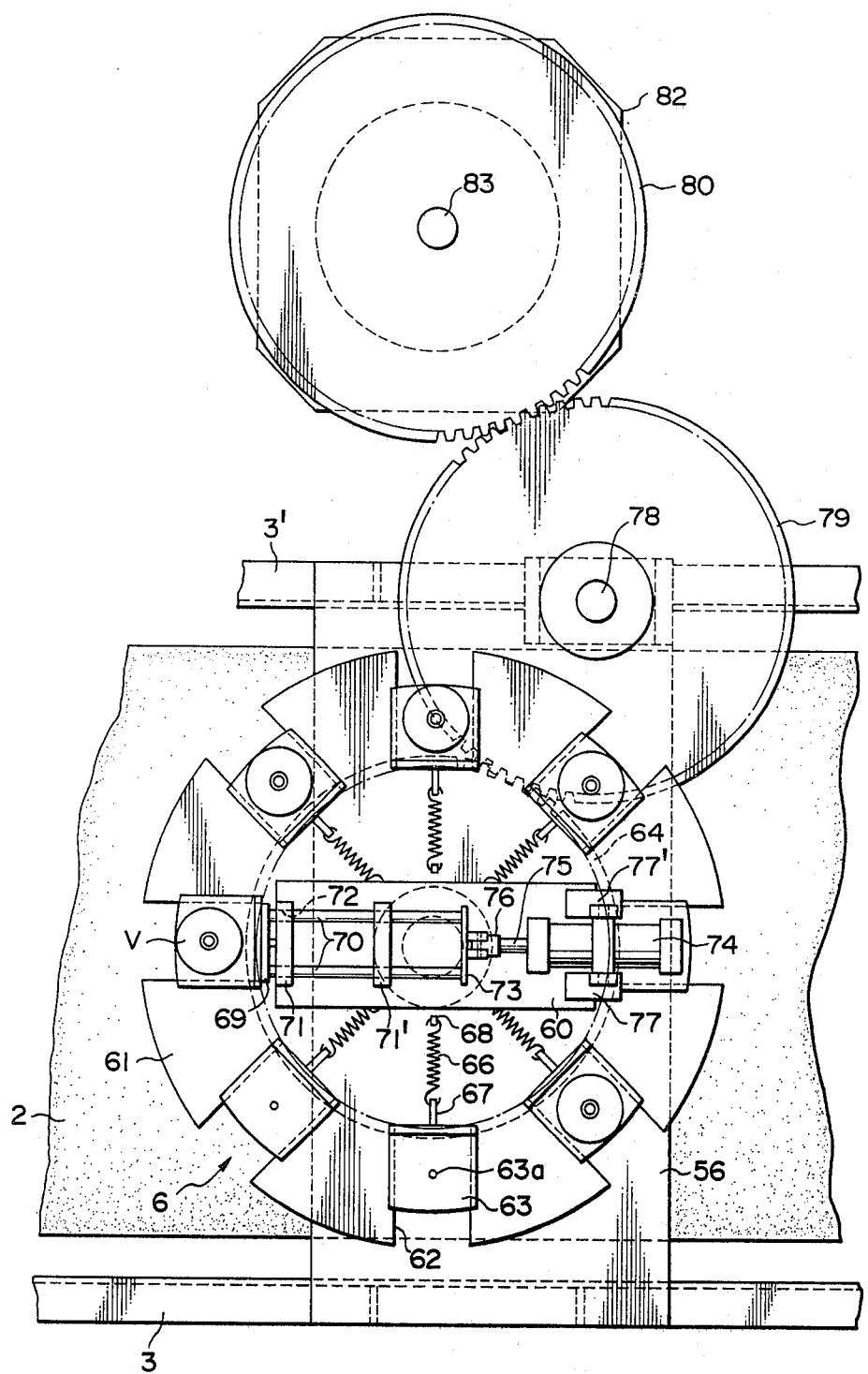
FIG. 6 is a view as seen from the line D—D of FIG. 3.
Figure 9:
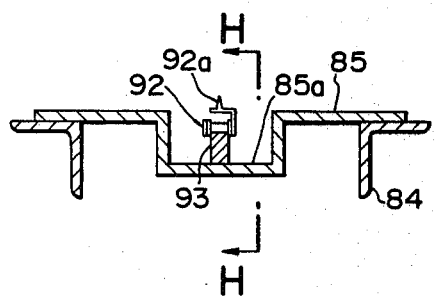
FIG. 9 is a cross-sectional view as seen from the line G—G of FIG. 8.
Figure 10:
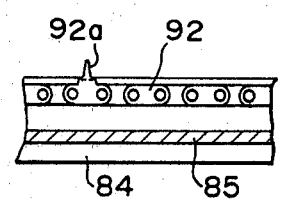
FIG. 10 is a cross-sectional view as seen from the line H—H of FIG. 9.

The valve feeding mechanism 6 is shown in FIGS. 3 and 6 as comprising a bracket 56 which is positioned forwardly of the valve transferring mechanism 5 in perpendicular relation with the transfer direction X of the endless belt 2 and which has both lower ends securely mounted on the frames 3 and 3', respectively. At the central portion of the bracket 56 is disposed a fixed shaft 57 forwardly of and in alignment with the valve holding member 31 of the valve transferring mechanism 5 in the transfer direction X of the endless belt 2, the fixed shaft 57 having an upper end threadly engaged with a fixed member 58. The fixed member 58 has a lower portion receiving thereon a bearing 59 and an upper end fixedly supporting a plate 60. A circular plate 61 is rotatably supported on the fixed shaft 57 through the bearing 59 and has eight radial grooves 62 which are formed equi-angularly and each of which slidably receives a slider 63 for mounting thereon the tube valve V. In order to prevent movement of the tube valve V on the slider 63 during sliding movement of the slider 63, a tapered and upwardly extending projection 63a is formed on the central portion of each of the sliders 63. A gear 64 is securely carried on the boss of the circular plate 61 therebelow to be rotated in unison with the circular plate 61. A fixing member 65 is attached to the upper end of the boss of the circular plate 61 so as to prevent the circular plate 61 from being detached downwardly from the fixed shaft 57. Eight tension coil springs 66 each has a radially outer end connected to a projection 67 formed at the radially inner face of each of the sliders 63 and a radially inner end connected to each of eight projections 68 circumferentially equiangularly formed on the central portion of the circular plate 61 so that the tension coil springs 66 normally urge the sliders 63 radially inwardly within the radial grooves 62. An urging plate 69 has tapered lower end to be engaged with the radially inner face of the slider 63 for moving the slider 63 radially outwardly against the tension coil spring 66. The urging plate 69 is securely connected at its upper end portion with one ends of parallel spaced guide rods 70 which are slidably received in bores 72 formed in projecting members 71 and 71' which are radially spacedly mounted on the plate 60. To the other ends of the guide rods 70 is attached a connecting member 73 which is pivotally connected to a member 76 fixed to the leading end of a piston rod 75 of a fluid-operated cylinder 74. The fluid-operated cylinder 74 is pivotally supported at its longitudinally intermediate portion on spaced brackets 77 and 77' securely mounted on the plate 60. A vertical shaft 78 is securely mounted on one end of the bracket 56 and rotatably supports through bearing (not shown) a gear 79 is meshing relation with the gear 64. A gear 80 is in meshing engagement with the gear 79 and is securely carried on an output shaft 83 of an indexing table 82 supported on an independent or separate frame 81 (see FIG. 1). It is thus to be noted that the tube valve V on the slider 63 is moved into a nearest position to and below the valve holding member 31 one by one by intermittently rotating the indexing table 82. The indexing table 82 is in turn rotated by the electric signal produced by the limit switch 53 when the cam member 48 is rotated into engagement with the limit switch 53. The piston rod 75 of the fluid-operated cylinder 74 is retracted by the action of the limit switch 53 not to hinder the rotation of circular plate 61.

A valve replenishing mechanism 7 is provided in the vicinity of and in parallel relation with the conveyor mechanism 1 to replenish the tube valve V one by one to the sliders 63 of the valve feeding mechanism 6 when one of the tube valves V on the sliders 63 has been transferred onto the tube material T by the action of the valve transferring mechanism 5. The valve replenishing mechanism 7 is shown in FIG. 2 and FIGS. 7 to 12 as comprising a conveyor frame 84 provided in parallel with and in the vicinity of the conveyor mechanism 1 and a grooved plate 85 securely mounted on the conveyor frame 84. At the both longitudinally outer end portions of the conveyor frame 84 are provided two pairs of facing and spaced bearings 86 and 87 which are adapted to rotatably support shafts 88 and 89, respectively. Sprocket wheels 90 and 91 are respectively securely carried on the shafts 88 and 89 through keys (not shown) and an endless chain 92 is stretched over the sprocket wheels 90 and 91. On the central portion of the bottom 85a of the grooved plate 85 is securely mounted a straight rail 93 which extends between the sprocket wheels 90 and 91 to support the upper half of the endless chain 92. The previously mentioned grooved plate 85 has a pair of openings 85b formed at the both longitudinal ends so as to prevent rotation of the sprocket wheels 90 and 91. As particularly shown in FIG. 7, there are slidably mounted on the grooved plate 85 a plurality of valve supporting members 94 each of which is formed at its upper portion thereof with equally spaced large bores 94a to receive stem portions of the tube valves V. Each of the valve supporting members 94 is also formed at its lower portion thereof with small bores 94b communicated with the large bores 94a to be engaged with tapered projections 92a equally spacedly mounted on the endless chain 92. Attached to the side of one end of the conveyor frame 84 is a stand 95 on which a bearing 97 rotatably supporting a shaft 96 in concentrical relation with the shaft 88. The shaft 96 has an axial portion extending outwardly of the bearing 97 to securely carry a pinion gear 98 through a key 99 and an axial portion extending inwardly of the bearing 97 to be connected with a clutch 100 mounted on the stand 95. The shaft 88 has an axial portion extending outwardly of the conveyor frame 84 toward the shaft 96 to be connected with a brake 101 which is in turn drivingly associated with the clutch 100 and mounted on the stand 95 so that engagement of the clutch 100 causes the rotational torque of the pinion gear 98 to be transmitted to the shaft 88 while disengagement of the clutch 100 causes the brake 101 to be actuated for stopping the shaft 88.

Figure 11:
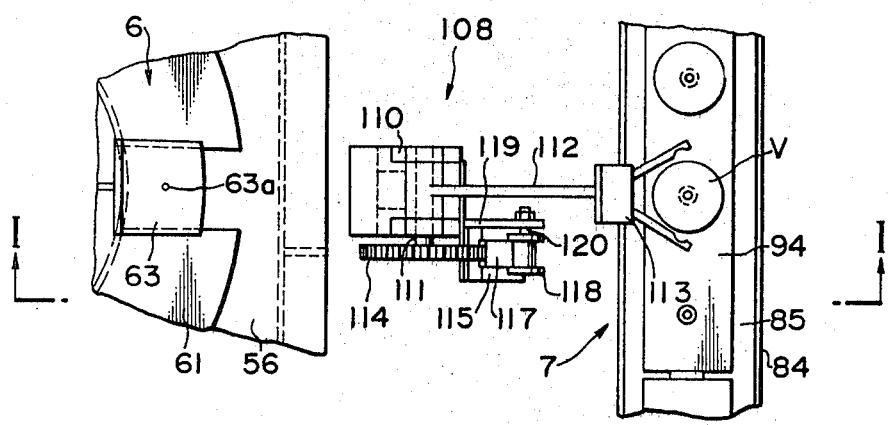
Figure 12:
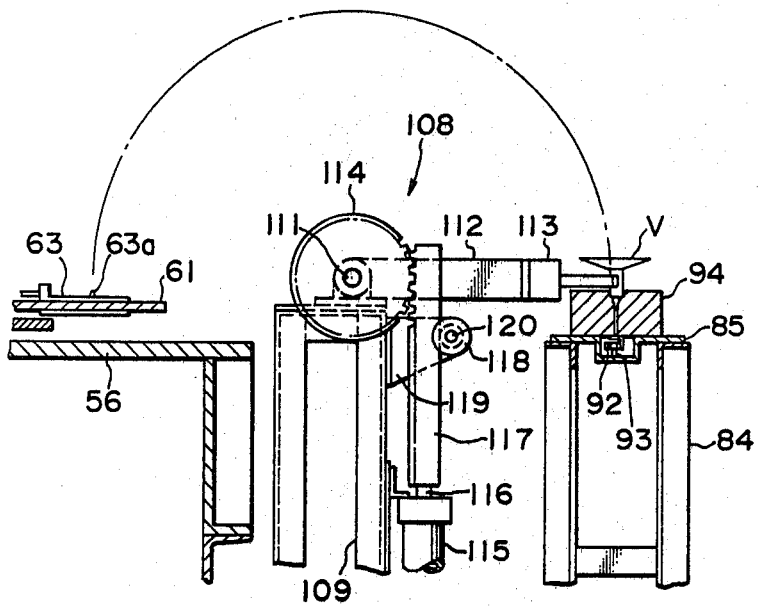
FIG. 12 is a cross-sectional view as seen from the line I—I of FIG. 11.

A fluid-operated cylinder 102 is vertically attached to the side face of the stand 95 and has a piston rod 103 which has a leading end carrying thereon a rack 104 in meshing relation with the pinion gear 98. A guide roller 105 is rotatably mounted on a fixed shaft 107 to be in rolling contact with the rear face of the rack 104 to guide the vertical movment of the rack 104. The fixed shaft 107 is securely mounted on the upper end of a bracket 106 which is in turn mounted on the stand 95. It is thus to be noted that the actuation of the fluid-operated cylinder 102 causes the piston rod 103 to be projected upwardly and retracted downwardly, thereby causing the valve supporting member 94 to be intermittently moved through the rack 104, the pinion gear 98, the shaft 96, the clutch 100, the shaft 88, the sprocket wheels 90, 91 and the endless chain 92. Between the conveyor mechanism 1 and the conveyor frame 84 is located a valve displacing arrangement generally designated at 108 which is to displace the tube valves V one by one from the valve supporting members 94 onto the sliders 63 of the valve feeding mechanism 6 which has no tube valve V thereon. The particular construction of the valve displacing arrangement 108 is shown in FIGS. 11 and 12 as comprising a dependent or separate frame 109 on which a pair of bearings 110 are mounted to rotatably support a shaft 111. An arm member 112 is securely connected at its one end to the shaft 111 through a key (not shown) and at its other end to a valve gripping member 113 for gripping the tube valve V mounted on the valve supporting member 94. The valve gripping member 113 is actuated by compressed air to be closable, and is well known in the art so that there will be no particular construction thereabout hereinafter. The shaft 111 has an axial portion extending outwardly of the bearing 110 to securely carry a pinion gear 114 through a key (not shown). A fluid-operated cylinder 115 is vertically attached to the side face of the frame 109 and has a piston rod 116 which has a leading end carrying thereon a rack 117 in meshing relation with the pinion gear 114. A guide roller 118 is rotatably mounted on fixed shaft 120 to be in rolling contact with the rear face of the rack 117 to guide the vertical movement of the rack 117. The fixed shaft 120 is securely mounted on the free end of a bracket 119 which is in turn mounted on the frame 109. It will thus be understood that the actuation of the fluid-operated cylinder 115 causes the piston rod 116 to be projected upwardly and retracted downwardly, thereby causing the arm member 112 to be rotated as shown in a phantom line of FIG. 12 through the rack 117, the pinion gear 114 and the shaft 111. The valve gripping member 113 is therefore moved from a position immediately above the valve supporting member 94 to a position immediately above the slider 63 of the valve feeding mechanism 6 and vice versa. The actuation of the fluid-operated cylinder 115 is caused after the rotation of the indexing table 82 is stopped.

Figure 13:
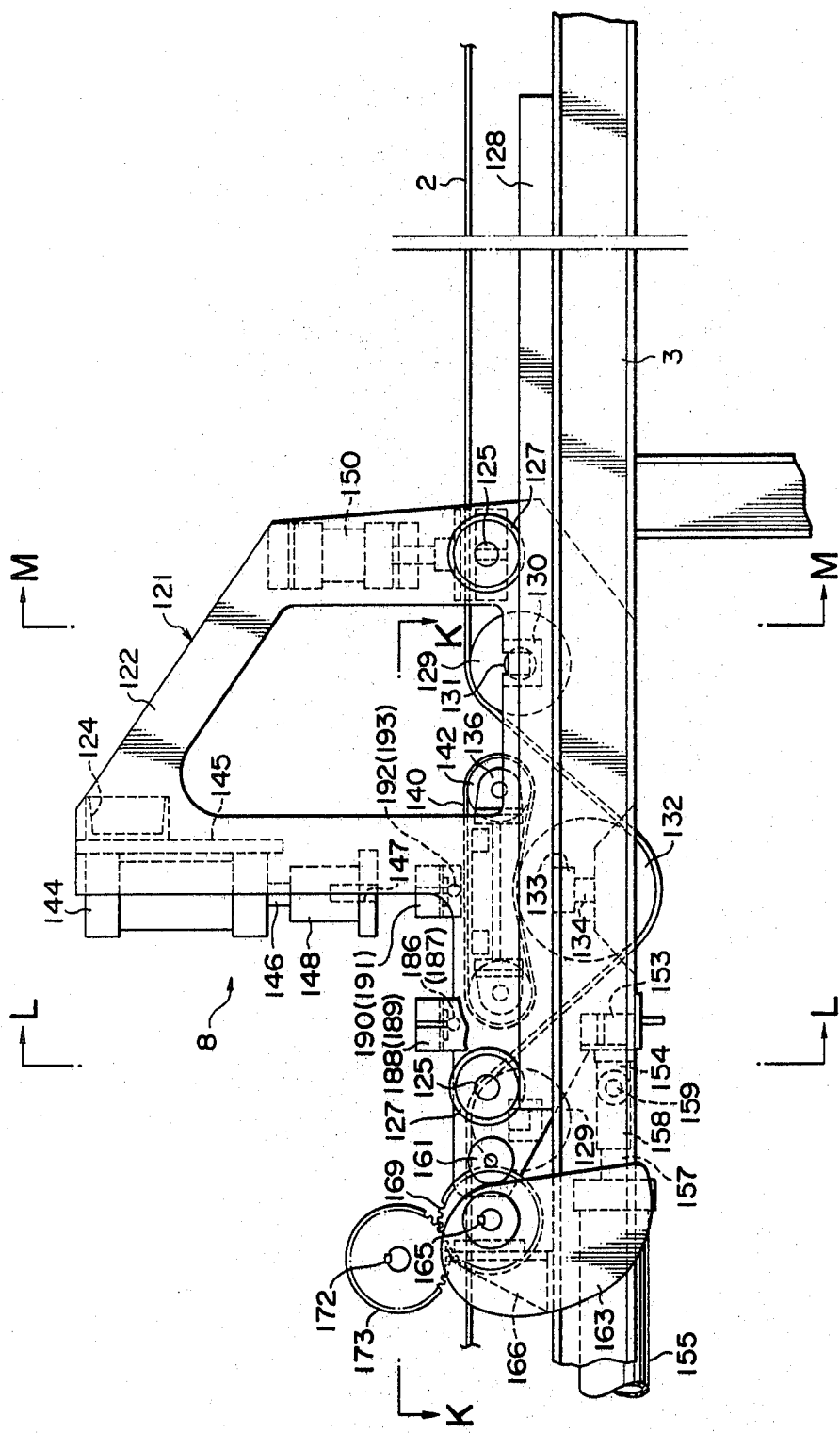
FIG. 13 is an enlarged front view as seen from the line J—J of FIG. 2.
Figure 14:
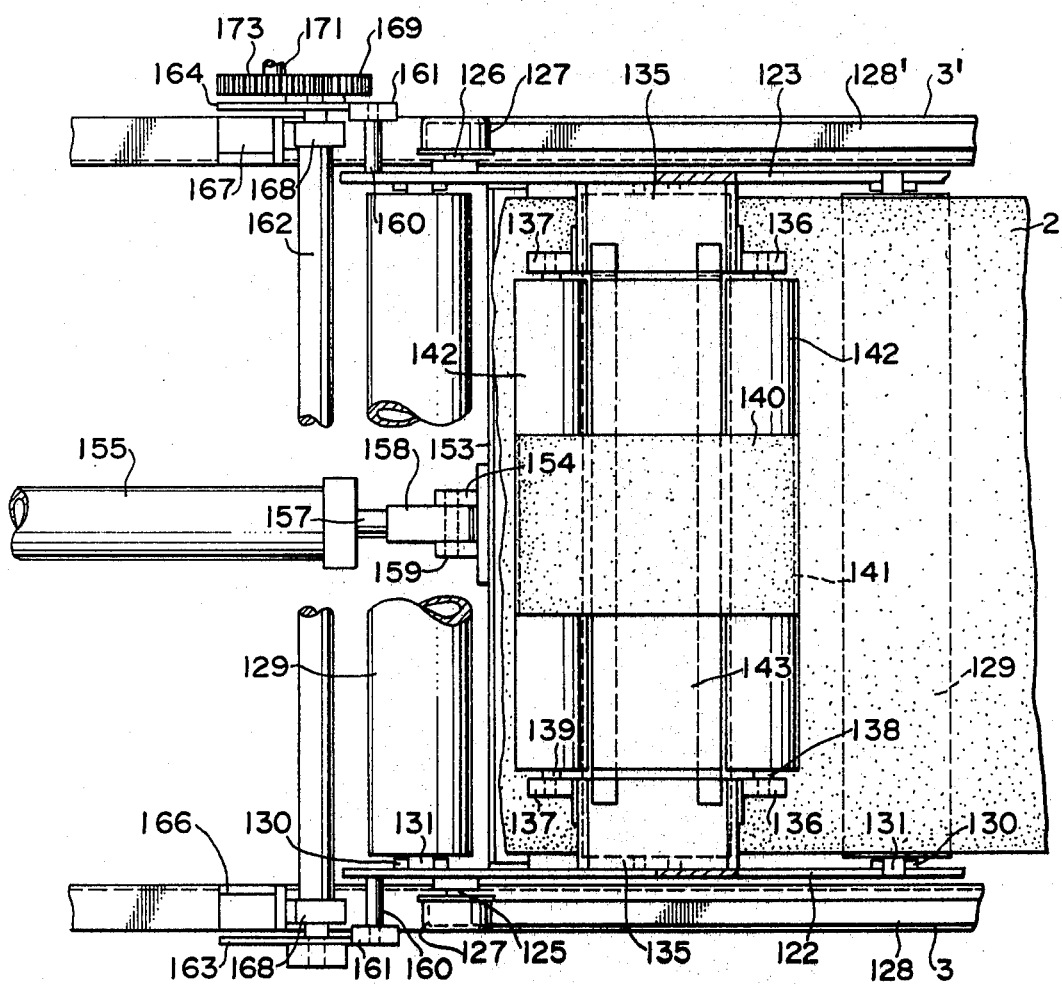
FIG. 14 is a view as seen from the line K—K of FIG. 13.
Figure 15:
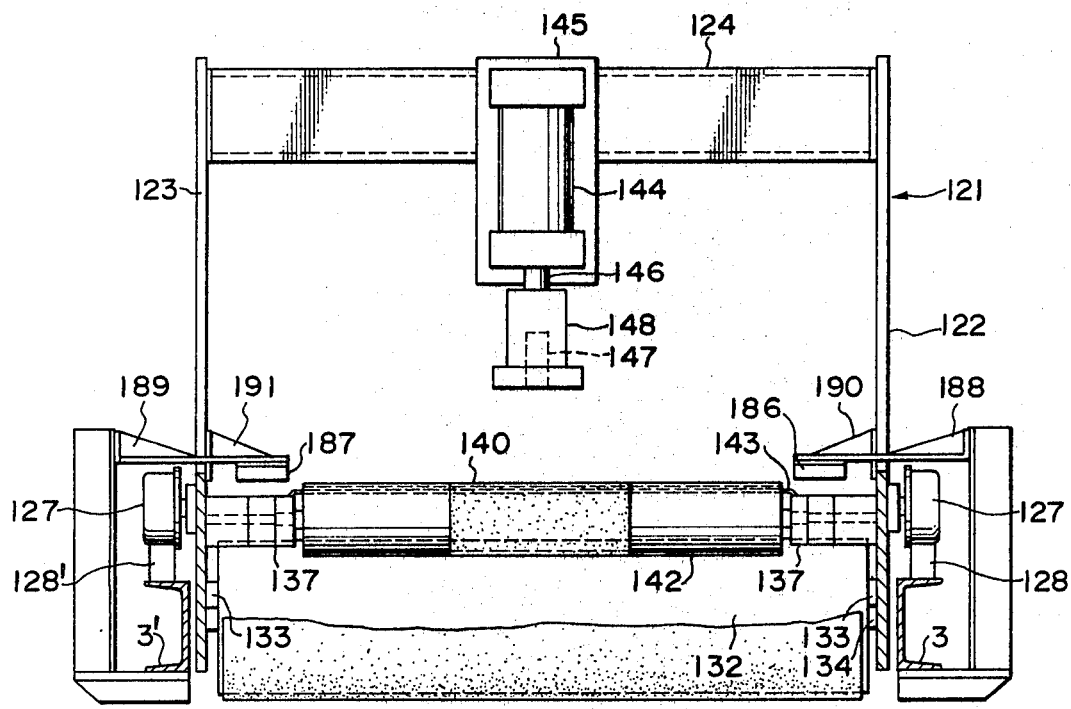
FIG. 15 is a view as seen from the line L—L of FIG. 13.
Figure 16:
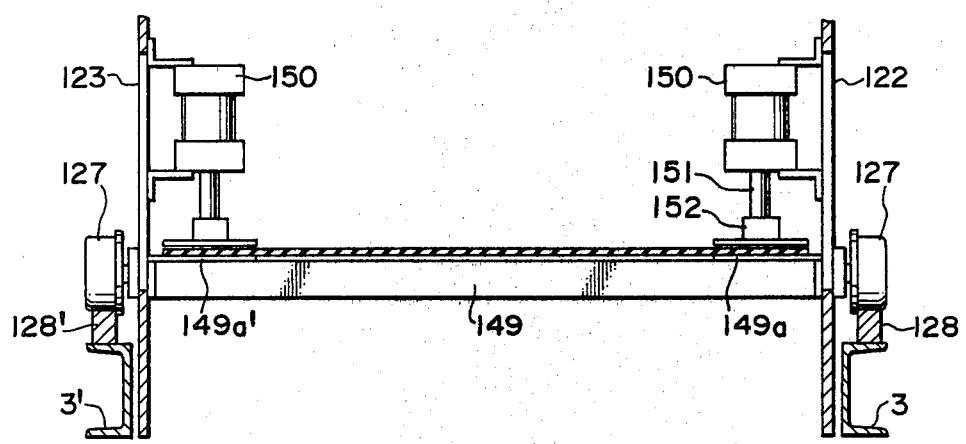
FIG. 16 is a view as seen from the line M—M of FIG. 13.

The valve urging mechanism 8 for urging the tube valve V transferred onto the tube material T by the valve transferring mechanism 5 against the tube material T for a predetermined period of time in synchronism with the transfer of the tube valve V is shown in FIGS. 13 to 16 as comprising a movable frame 121 having a pair of spaced and facing vertical side plates 122 and 123, and a horizontal beam 124 securely connected at its both ends to the upper inner faces of the side plates 122 and 123. On the lower outer sides of the side plates 122 and 123 are mounted two pairs of fixed shafts 125 and 126 on which are rotatably carried travelling wheels 127 each accommodating therein a bearing (not shown). The travelling wheels 127 are adapted to be in rolling contact with a pair of spaced parallel rails 128 and 128' which are mounted on the frames 3 and 3', respectively. A pair of guide rollers 129 are provided at the lower end portions of the movable frame 121 in spaced and parallel relation with each other and each accommodates therein a bearing (not shown). Each of the guide rollers 129 has both ends rotatably supported on a pair of fixed shafts 131 the outer ends of which are supported on U-shaped supporting members 130 attached to the inner sides of the side plates 122 and 123. A guide roller 132 is provided at the central lower end portion of the movable frame 121 in contact with the endless belt 2 and accommodates therein a bearing (not shown). The guide roller 132 has both ends rotatably supported on a pair of fixed shafts 134 the outer ends of which are securely supported on supporting members 133 attached to the inner sides of the side plates 122 and 123. A pair of I-shaped horizontal brackets 135 are respectively securely attached to the inner faces of the side plates 122 and 123 and each has a pair of bearings 136 and 137 at the fore and rear faces thereof. The bearings 136 and 137 respectively rotatably support rotary shafts 138 and 139 on each of which is securely mounted a horizontal roller 142 formed at its peripheral wall with a groove 141 to receive an endless belt 140 stretched over the horizontal rollers 142 and in contact with the guide roller 132. A flat supporting plate 143 is securely connected at its longitudinal ends to the inner upper faces of the horizontal brackets 135 to be in sliding contact with the endless belt 140 for supporting thereof. Onto the longitudinally intermediate portion of the rear face of the horizontal beam 124 is attached a vertically extending plate 145 on which a vertical fluid-operated cylinder 144 is securely mounted having a piston rod 146. A valve urging member 148 is securely connected to the leading end of the piston rod 146 and has a closed bore 147 formed therein to engage the stem portion of the tube valve V for urging the tube valve V against the tube material T. A supporting plate 149 is securely connected at its both ends to the forward inner faces of the side plates 122 and 123 in the vicinity of the travelling wheels 127 and has a pair of flat portions 149a and 149a' formed at its outer end portions to be in sliding contact with the endless belt 2 for supporting thereof. A pair of vertical fluid-operated cylinders 150 are securely attached to the inner faces of the side plates 122 and 123 and each has a piston rod 151 extending toward each of the flat portions 149a and 149a' of the supporting plate 149. Onto each of the leading ends of the piston rods 151 is attached a belt gripping member 152 for gripping the endless belt 2 in cooperation with the flat portion of the supporting plate 149. It is thus to be noted that when the fluid-operated cylinders 150 are simultaneously actuated to cause the piston rods 151 to be projected downwardly, the belt gripping members 152 grip the endless belt 2 in cooperation with the flat portions 149a and 149a' of the supporting plate 149 so that the removable frame 121 can be travelled at a running speed equal to that of the endless belt 2. A horizontal beam 153 is connected at its both ends to the rear lower end portions of the side plates 122 and 123 and has a longitudinally intermediate rear face integrally formed with a bracket 154. A horizontal fluid-operated cylinder 155 is pivotally supported at its longitudinally intermediate portion by a bracket 156 (see FIG. 1) which is securely mounted on the frame 3 and has a piston rod 157 which has a leading end integrally formed with a connecting member 158 pivotally connected with the bracket 154 through a pivotal pin 159. A pair of fixed shafts 160 are attached to the outer rear faces of the side plates 122 and 123 and each has a free end carrying a bearing 161. On the frames 3 and 3' are securely mounted brackets 166 and 167, respectively, having bearings 168 which rotatably support a shaft 162 at its both end portions. A pair of cam plates 163 and 164 are securely carried through keys 165 on the axial portions extending outwardly of the bearings 168 to be engageable with the bearings 161. As best shown in FIGS. 13 and 14, the shaft 162 has an axial portion extending outwardly of the cam plate 164 to securely carry a gear 169 in meshing relation with a gear 173 which is in turn securely carried on an output shaft 171 of a reduction gear unit 170 (see FIGS. 1 and 2) through a key 172. With reference particularly to FIGS. 1 and 2, a brake 174 is carried on the output shaft 171 for braking the rotation of the output shaft 171. A clutch 175 is provided between an input shaft 176 of the reduction gear unit 170 and a shaft 178 securely carrying a sprocket wheel 177 and is designed to be actuated not to transmit the rotational torque of the shaft 178 to the input shaft 176 of the reduction gear unit 170 after one revolution of the gear 173. The reduction gear unit 170 is mounted on a frame 179 which has a lower side supporting a bracket 180. A bearing 181 is mounted on the bracket 180 to rotatably support one end of a rotary shaft 183 which carries a roller 182 for guiding the endless belt 2. The rotary shaft 183 has an axial portion extending outwardly of the bearing 181 to securely carry a sprocket wheel 184 which is in driving connection with the sprocket wheel 177 by means of an endless chain 185. Light projector and receiver 186 and 187 are respectively provided on brackets 188 and 189 mounted on the frames 3 and 3' rearwardly of the urging member 148 so as to produce an electric signal upon detection of the tube valve V passing between the light projector 186 and receiver 187. Likewise, light projector and receiver 192 and 193 are provided on brackets 190 and 191 mounted on the inner faces of the side plates 122 and 123 in such a manner that a line connecting the light projector 192 and the light receiver 193 is positioned immediately below the valve urging member 148. An electric signal of the light projector 192 and the light receiver 193 is adapted to be produced when the tube valve V reaches a position immediately below the valve urging member 148 so that the fluid-operated cylinder 144 is actuated to cause the piston rod 146 to be projected downwardly, thereby causing the valve urging member 148 to be descend for urging the tube valve V against the tube material T.

The operation of the embodiment thus constructed and arranged in accordance with the present invention will be described hereinlater.

In the preparation stage, a number of tube valves V are mounted on the valve supporting member 94 in such a manner that the stem portions of the tube valves V are inserted into the large bores 94a of the valve supporting member 94. Adhesive is then applied on each of the bottom faces of the tube valve V, and thereafter the tapered projections 92a on the endless chain 92 of the valve replenishing mechanism 7 are brought into engagement with the small bores 94b of the valve supporting member 94 when the valve supporting members 94 are lined up on the grooved plate 85. At this time, the leading tube valve V on the leading valve supporting member 94 is positioned in face-to-face relation with the valve gripping member 113. Eight tube valves V are then manually mounted on the sliders 63 of the valve feeding mechanism 6. After completition of such preparation stage, the tube material T is extruded by a suitable extruder simultaneously with the start of a driving mechanism (not shown) for travelling the endless belt 2. The fluid-operated cylinder 74 of the valve transferring mechanism 5 is then actuated by other electric signal to cause the piston rod 75 to be projected outwardly so that the urging plate 69 is moved outwardly, thereby causing the slider 63 to be moved radially outwardly against the tension coil spring 66 so as to allow the tube valve V to be located immediately below the valve holding member 31 of the valve transferring mechanism 5. The fluid-operated cylinder 28 is then actuated to cause the piston rod 30 to be projected downwardly and the pipes 32 of the valve holding member 31 are simultaneously vacuumized so that the tube valve V on the slider 63 is suckingly held by the lower ends of the pipes 32. The fluid-operated cylinder 28 is then actuated to cause the piston rod 30 to be retracted upwardly, thereby causing the tube valve V to be maintained held by the pipes 32. The fluid-operated cylinder 74 is then actuated to cause the piston rod 75 and the urging plate 69 to be retracted inwardly so that the vacant slider 63 is moved radially inwardly by the force of the tension coil spring 66. When the tube material T is then passed through the valve feeding mechanism 6, the perforating mechanism 4 is actuated to cause the upper half of the tube material T to be perforated forming an air introducing bore. Simultaneously with the perforation of the tube material T, the valve holding member 31 starts rotation while holding the tube valve V through the gears 42, 39, 36, 37, 38, the arm members 21, 22 and the link member 25, and ejects the tube valve V just when the pipes 32 are rotated into their lowermost position, i.e., into the nearest position to the air introducing bore of the tube material T as shown in phantom lines in FIG. 4. The valve tube V is thus shot exactly against the air introducing bore since the tooth numbers of the gears 36, 37, 38, 39, 42 and the arm members 21, 22 are ajusted for this purpose previously mentioned in detail. After the ejection of the tube valve V, the valve holding member 31 is restored to the initial position shown in FIGS. 3 and 4. The changing to the compressed air from the vacuum air for ejecting the tube valve V is carried out by changing the changing valve into communication with the compressed air source from the vacuum source, resulting from the electric signal produced upon the actuation of the limit switch 55 brought into engagement with the cam member 50. When the valve holding member 31 on the other hand starts rotation from the initial position, the limit switch 53 is actuated by the cam member 48 to produce its electric signal so that the circular plate 61 is rotated by the indexing table 82 through the gears 80, 79 and 64 to allow the subsequent tube valve V on the following slider 63 to be rotated in preparation for the subsequent operation. When the circular plate 61 is rotated to cause the vacant slider 63 to assume a position in alignment with the arm member 112 of the valve displacing arrangement 108, the valve gripping member 113 is actuated to grip the tube valve V on the valve supporting member 94. The fluid-operated cylinder 115 is then actuated to cause the piston rod 116 to be projected upwardly so that the arm member 112 is rotated through the rack 117 and the pinion gear 114, thereby causing the valve gripping member 113 to be rotated from the position immediately above the valve supporting member 94 to the position immediately above the vacant slider 63 of the valve feeding mechanism 6. The tube valve V is then released from the valve gripping member 113 to be replenished onto the vacant slider 63. At this time, the valve supporting members 94 are moved by a distance equal to that between the tube valves V on the supporting members 94 by the action of the fluid-operated cylinder 102, and the next leading tube valve V on the leading supporting member 94 thus assumes a waiting position in face-to-face relation with the valve gripping member 113 for waiting the subsequent operation. After replenishing operation of the tube valve V onto the vacant slider 63 of the valve feeding mechanism 6, the fluid-operated cylinder 115 is again actuated to cause the piston rod 116 to be retracted downwardly so that the arm member 112 is rotated to cause the valve gripping member 113 to be moved to the position immediately above the next leading tube valve V on the leading supporting member 94 for waiting the subsequent operation.

The tube material T applied with the tube valve V is then transferred by the endless belt 2 toward the valve urging mechanism 8.

When the light projected from the light projector 186 provided in the valve urging mechanism 8 is intercepted by the tube valve V, the light receiver 187 detects the passing of the tube valve V to produce an electric signal which causes the clutch 175 to be engaged with each other so that the input shaft 176 of the reduction gear unit 170 is rotated through the clutch 175 by the shaft 178 which is at all times driven for rotation by an suitable electric motor through the sprocket wheel 184, the endless chain 185 and the sprocket wheel 177. The electric signal of the light receiver 187 concurrently releases the brake 174 to cause the rotational torque of the output shaft 171 to be transmitted to the gear 173. The cam plates 163 and 164 are thus rotated by the gear 169 in meshing engagement with the gear 173. As a result of this, the cam plates 163 and 164 urge the bearings 161 forwardly, thereby causing the movable frame 121 to be moved forwardly along the endless belt 2 until the transfer speed of the movable frame 121 reaches substantially the same travelling speed of the endless belt 2. The clutch 175 is then disengaged while the brake 174 is actuated to stop rotation of the shaft 171 after synchronization between the transfer speed of the movable frame 121 and the endless belt 2, whereupon the cam plates 163 and 164 are stopped in the state as shown in FIGS. 1 and 13. When the light projected from the light projector 193 is intercepted by the further advanced tube valve V, the light receiver 193 detects the passing of the tube valve V to produce an electric signal which causes the fluid-operated cylinders 150 to be actuated, projecting the piston rods 151 downwardly so that the endless belt 2 is gripped by the belt gripping members 152 and the flat portions 149a and 149a' of the supporting plate 149. As a result of this, the movable frame 121 is moved forwardly jointly with the endless belt 2. The electric signal of the light receiver 193 concurrently actuates the fluid-operated cylinder 144 to cause the piston rod 146 to be projected downwardly so that the valve urging member 148 urges the tube valve V against the tube material T for a period of several seconds. The fluid-operated cylinder 144 is then actuated to cause the piston rod 146 and the valve urging member 148 to be retracted upwardly for completition of an urging operation of the tube valve V against the tube material T, while the fluid-operated cylinders 150 are actuated to cause the piston rods 151 and the belt gripping members 152 to be retracted upwardly for releasing the belt gripping members 152 from the endless belt 2. This results in stopping of the movement of the movable frame 121. The fluid-operated cylinder 155 is actuated to cause the piston rod 157 to be retracted backwardly so that the movable frame 121 is moved back to the position shown in FIG. 1 for waiting the subsequent operation.

While there has been described about an operational cycle that the tube valve V is applied on the tube material T around the air introducing bore, it will be understood that if such an operational cycle is repeated a number of tube valves V are continuously applied onto the tube material T around the air introducing bores.

As mentioned above, it will be understood that the present invention overcomes all the conventional drawbacks and ensures that the tube valves are continuously applied onto the tube material around the air introducing bores perforated equally spacedly in its longitudinal direction as well as that the production rate for making tire tubes is increased.

Although the particular embodiment of the present invention has been shown and described, it will be obvious to those skilled in the art that various changes and modifications may be made without departing from the spirit and scope of the present invention.

What is claimed is:

1. A tire tube making apparatus comprising:
   a conveyor mechanism including a stationary frame and an endless belt travelled on said stationary frame by a drive source for conveying a tube material;
   a perforating mechanism for perforating air introducing bores longitudinally equally spaced in an upper half portion of said tube material;
   a valve feeding mechanism for intermittently feeding a tube valve one by one to a predetermined position above the line passing through said air introducing bores perforated in said tube material which is continuously conveyed by said conveyor mechanism;
   a valve transferring mechanism for suckingly holding said tube valve fed by said valve feeding mechanism to transfer said tube valve one by one on said air introducing bore in synchronism with the transfer of said air introducing bore of said tube material; and
   a valve urging mechanism for detecting said tube valve transferred by said valve transferring mechanism and including a movable frame movable on said stationary frame, a gripping device mounted on said movable frame to grip said endless belt for moving said movable frame jointly with said endless belt, and a valve urging device mounted on said movable frame for urging said tube valve against said tube material.

2. A tire tube making apparatus as set forth in claim 1, in which said valve urging mechanism further includes at least a cam plate rotatably mounted on said stationary frame of said conveyor mechanism for moving said movable frame up to its transfer speed substantially equal to the travelling speed of said endless belt prior to gripping of said endless belt by said gripping device.

* * * * *